United States Patent [19]

Kubota et al.

[11] Patent Number: 5,338,584
[45] Date of Patent: Aug. 16, 1994

[54] ARTIFICIAL GRANITE SOLID MATERIAL

[75] Inventors: Yoshikazu Kubota, Fujinomiya; Masayasu Kamijo, Fuji; Hiroshi Otsu; Takashi Kamiya, both of Aichi, all of Japan

[73] Assignees: Kohjin Co., Ltd., Tokyo; Aica Kogyo Co., Ltd., Aichi, both of Japan

[21] Appl. No.: 608,482

[22] Filed: Nov. 2, 1990

[51] Int. Cl.$^5$ ............................................. B44F 9/04
[52] U.S. Cl. ..................................... 428/15; 156/61; 428/274; 428/537.5
[58] Field of Search ............... 428/15, 113, 511, 514, 428/537.5, 288, 275, 274; 162/126, 127, 128, 145, 146, 162, 181.1; 156/61

[56] References Cited

U.S. PATENT DOCUMENTS 4,518,764  5/1985  Tanaka et al. ...................... 528/271
4,956,030  9/1990  Baskin ................................. 156/61

Primary Examiner—Henry F. Epstein
Attorney, Agent, or Firm—Oliff & Berridge

[57] ABSTRACT

A granitic stone ( so-called Mikage-ishi)-like artificial solid material produced by impregnating a paper sheet having a granitic pattern with a thermosetting resin to give a paper containing from 25 to 60% by weight of the resin at the dry basis; drying the resin-impregnated paper sheet; and hot-pressing a laminate comprising a plurality of the dried sheets; is claimed, said paper mainly comprising (A) from 20 to 80% by weight of cellulose pulp, (B) from 2 to 40% by weight of an artificial fiber, (C) from 10 to 70% by weight of an inorganic filler less than 10 μm in average diameter, and (D) from 1 to 30% by weight of a fine-grained additive consisting of grains from 10 to 500 μm in average diameter, having a color hue different from that of the inorganic filler (C).

The artificial granite solid material has an excellent machinability, workability, and physical properties (strength), as well as good-looking textures (inorganic material like appearance, expressing by itself heaviness, hardness, and thickness; exhibits a very granitic look as a whole) with an ornamental and luxurious appearance.

2 Claims, No Drawings

ARTIFICIAL GRANITE SOLID MATERIAL

FIELD OF THE INVENTION

The present invention relates to a artificial granite, more particularly, it relates to a solid material which looks like a granitic stone (so-called Mikage-ishi), yet having excellent machinability, workability, and physical properties (strength), as well as good-looking textures (inorganic material like appearance, expressing by itself heaviness, hardness, and thickness; exhibiting an appearance which looks like a naturally occurring granitic stone as a whole) with ornamental and luxurious appearances.

BACKGROUND OF THE INVENTION

Artificial granite solid materials known to the present are included in the field of artificial granites, which are produced by extrusion-molding a synthetic resin mixed therein a black colored fine-grained powder and an inorganic filler such as aluminum hydroxide. They are provided as plates or in other shapes as desired, and the resin used therein are mostly acrylic resin and polyester resin.

The aforementioned artificial granite solid materials in the field of artificial granites are, in general, poor in physical properties and have therefore difficulties in producing thin sheets therefrom. Even though they are made into thin sheets at best, the sheets are liable to break and are far from being practical. Accordingly, the solid materials are made into plates having a certain thickness that they cannot undergo bending processes or the like. Furthermore, since they are inferior in thermal and abrasion resistances, their applicability is somewhat restricted, and this constitutes another disadvantageous point for the conventional artificial granite solid materials.

SUMMARY OF THE INVENTION

The present inventors have intensively and extensively conducted studies to overcome the aforementioned disadvantages of the prior art materials, and as a result found a artificial granite solid material well comparable to a naturally occurring granitic stone in texture, as well as in ornamental and luxurious appearances, yet having excellent physical properties. The present invention has been completed based on such findings.

More specifically, the present invention relates to a artificial granite solid material produced by impregnating a granitic paper having a specified composition with a thermosetting resin, drying the paper to control the resin content to from 25 to 60% by weight, laminating a plurality of the resin-impregnated paper, and hot-pressing the paper laminate.

The granitic paper in the present invention signifies a paper having flecks which gives an appearance like a granitic stone. This paper comprises as the main components, from 20 to 80% by weight of cellulose pulp, from 2 to 40% by weight of an artificial fiber, from 10 to 70% by weight of an inorganic filler less than 10 $\mu$m in average diameter, and from 1 to 30% by weight of a fine-grained powder additive from 10 to 500 $\mu$m in average diameter having a hue different from that of the inorganic filler. Alternatively, the paper is such comprising a matrix paper containing as the main components, from 20 to 80% by weight of cellulose, from 2 to 40% by weight of an artificial fiber, and from 10 to 70% by weight of an inorganic filler less than 10 $\mu$m in diameter; having on either or both sides thereof a fleck-patterned layer containing a fine-grained powder consisting of grains 500 $\mu$m or less in average diameter, said layer(s) having flecks from 10 to 500 $\mu$m in diameter.

The granitic paper or the matrix paper for use therein are produced by a known wet method for paper-making or a like method.

The wet method for paper-making or a like method referred to herein encompasses methods which comprise spreading a water dispersion containing the aforementioned components on a filter medium such as a filter screen of various shapes (e.g., belts, cylinders, and squares), filter cloth, and filter board; otherwise, sandwiching the water dispersion between filter media above; and subjecting the water dispersion to, for example, normal filtration or filtration under reduced pressure to give a sheet.

The cellulose pulp in the present invention renders sufficient strength to the paper and at the same time carries the inorganic filler. The paper comprises by weight, from 20 to 80% by weight of at least one type of cellulose pulp. If the pulp content is less than 20% by weight, the strength of the resulting paper is too weak, and causes breakage at the resin impregnating step or in the hot-pressing step. If the pulp content exceeds 80% by weight, on the other hand, the favorable material texture, such as an inorganic material like appearance, is lost and thereby a pulp content exceeding 80% by weight is not preferred.

The cellulose pulp for use in the present invention specifically includes cotton litter pulp, bleached sulfite pulp (NBSP, LBSP), bleached kraft pulp (NBKP, LBKP), and dissolved pulp (DP).

The artificial fibers are used in the present invention for the purpose of rendering the paper physical properties as a molded plate, such as dimensional stability, abrasion resistance, shock resistance, and thermal resistance. Thus, the paper comprises from 2 to 40% by weight of at least one type of an artificial fiber. If the amount of the fiber is less than 2% by weight, the resulting physical properties appear insufficient to meet the required value; if the amount thereof exceeds 40% by weight the interlayer strength of the paper is reversely affected such that the paper becomes liable to breakage at the resin impregnation or at the hot-pressing step.

As the artificial fiber for use in the present invention, mentioned are artificial inorganic fibers such as long glass fiber (chopped strand), short glass fiber (microglass), alumina-silica fiber (ceramic fiber), alumina fiber, mullite fiber, quartz fiber, silicate glass fiber, rock wool, potassium titanate fiber, zirconia fiber, and calcium sulfate fiber, as well as artificial organic fibers such as polyester fiber, nylon fiber, Vinylon, polyvinyl alcohol (PVA) fiber, rayon, polychlal, polypropylene (PP) fiber, aramid fiber, and Kynol (phenolic resin fiber).

Among the artificial fibers, more preferred are the synthetic inorganic fibers, because they are transparent and colorless, and also because they are superior in all the physical properties such as wager dispersibility, dimensional stability, abrasion resistance, heat resistance, and shock resistance. More preferably, said inorganic fibers are 10 $\mu$m or less in average diameter and from 0.1 to 8 mm in average length.

The inorganic filler is an essential component to deprive the plate of the plastic-like appearance a lightweight, soft, and low-density looking) and instead to uniformly give the molded plate an inorganic material-like appearance having weight, hardness, and a rock-like depth. The color of the matrix also depends on the filler. Thus, the material according to the present invention comprises from 10 to 70% by weight of an inorganic filler consisting of grains less than 10 μm in average diameter. The inorganic material-like appearance provided by the filler is particularly an important factor in the present invention. Without this inorganic material-like appearance, the product becomes a mere plastic plate and the value as merchandise is greatly reduced. If inorganic fillers consisting of grains 10 μm or larger in grain size are incorporated, the matrix of the resulting artificial granite solid material becomes non-uniform such that the homogeneous inorganic is somewhat lost. If the solid material comprises less than 10% by weight of the inorganic filler, the resulting product lacks a natural inorganic material-like appearance. If the content of the inorganic filler exceeds 70% by weight, the strength of the paper is reduced and it results in a paper which tends to break at the resin impregnation, hot-pressing, and the like process steps. Thus, a filler content of less than 10% or over 70% by weight is not favorable.

As the inorganic filler, mentioned are powders and fine fibrous materials less than 10 μm in length of naturally occurring inorganic materials such as silica stone, silica sand, diatomaceous earth, kaolin, halloysite, montmorillonite, bentonite, zeolite, phosphorite, diaspore, gibbsite, bauxite, Japanese acid clay, porcelain stone, pyrophyllite rock, feldspars, limestone, wollastonite, gypsum, dolomite, magnesite, and talc; water-insoluble metal hydroxides such as aluminum hydroxide, magnesium hydroxide, and calcium hydroxide; calcium silicate hydrates such as tobermorite and xonotlite; hydrated oxides such as hydrated calcium aluminate; synthetic inorganic materials such as alumina, silica, silica hydrates, colloidal silica, magnesia, zinc oxide, spinal, synthetic cordierite, synthetic mullite, synthetic zeolite, synthetic calcium carbonate, calcium phosphate, barium sulfate, magnesium carbonate, titanium oxide, and potassium titanate. Included also are whiskers, scaly fractions, and flakes of the aforementioned materials.

The artificial granitic solid material according to the present invention may further comprise, if necessary, paper additives such as water-soluble urea resin, melamine resin, cationized starch, CMC, polyamides, polyamines, epichlorohydrin resin, and polyacrylamide resin; polymer flocculants; and auxiliary agents such as aluminum sulfate and sodium aluminate. There may also be incorporated as a coloring agent, a trace amount of inorganic pigments such as molybdenum red, red oxide, and ultramarine; furthermore, organic pigments such as insoluble azo pigments, azo lakes, phthalocyanine pigments, triphenylmethanes, quinacridone pigments, thioindigozine pigments, dioxazine pigments, perinone perillene pigments, isoindolenone pigments, anthraquinone dyes, fluorubine dyes, coupling type azoic dyes, condensed azo dyes, and metal chelate pigments, can be added insofar as the addition thereof does not impair the inorganic-looking appearance of the resulting paper. Those pigments consist of fine grains less than 1 μm in diameter that they provide uniform color to the matrix paper, therefore, they should be distinguished from those fine-grained additives which are added to render the paper fleck patterns.

On the other hand, those additives comprising fine-grains or synthetic fibers as well as inorganic fillers, which are added for the purpose of rendering fleck patterns to the paper, may be previously treated with a silane coupling agent.

Concerning the step for rendering a fleck pattern to the paper, the fine-grained additives are previously incorporated in the mixture. At least one type of a fine-grained additive consisting of grains from 10 to 500 μm in average diameter and having a different color hue from the inorganic filler is added first together with the aforementioned components to obtain a water dispersion, in correspondence to the desired granitic stone-like solid material. This water dispersion is then subjected to paper making.

To obtain a granitic stone-like appearance, the fine-grained additives above preferably are mixed at an amount of from about 1 to 30% by weight. If the amount is less than 1% by weight, the flecks appear unfavorably too scarce; whereas an amount exceeding 30% by weight allows the flecks to become excessively dense and therefore to be superposed, which is also undesirable.

The fine-grained additives may be either inorganic or organic. Non-limiting examples thereof are colored, either by nature or artificially colored, inorganic powders such as active carbon powders (e.g., from coconut shell, saw dust, etc.), bituminous coal powder, coke powder, natural graphite powder, and iron oxide powder; synthetic resin powder colored dark, such as of nylon, polyvinyl chloride, thermosetting epoxy resin, acrylic resin, and polyester. The fine-grained additives may consist of spherical grains, flaky grains, whiskers, polygonal grains, or cylindrical grains, but it is preferred that their cross-sectional shapes give a granitic stone-like fleck, considering the use of the final product as a molded plate. The fine-grained additives preferably consist of grains from 10 to 500 μm in average diameter. If the grains are less than 10 μm in average diameter, the resulting flecks are too fine. If the grains are larger than 500 μm in average diameter, again it becomes a problem because the grains can no longer be sustained in the paper layer and fall off, leaving pinholes in the paper. It is further desired that the powder consists of grains not classified to a narrow grain size range, but that the grains thereof are properly distributed over a wide range so as to give a natural appearance as a granitic stone. It is also requisite in the case of using a resin powder, that the resins have a sufficiently high melting point so that they would not melt at the hot-pressing.

There is no particular restriction in the method for providing the fleck pattern to the paper matrix, however, considering that the paper has a rough surface, it is preferable to employ spray coating or the like. This method comprises applying to one or both surfaces of the paper, a water dispersion or an organic solvent dispersion containing at least one type of the fine-grained powder 500 μm or less in average diameter and having a color hue different from that of the inorganic filler, while properly controlling the size of the drops being sprayed. In this way it is possible to provide flecks from 10 to 500 μm in average diameter, and obtain the granitic stone-like paper. The dispersion used above may further contain a resin and a dispersion agent provided that their addition does not affect the object of the present invention. In carrying out this process of spray-coating or the like, there is no particular restriction concerning the shape and the size of the fine-grained powder provided that the grains of the powder fall in the grain diameter range of from 10 to 500 μm, but coarse grains exceeding 500 μm in diameter are not preferred because they tend to fall off in the paper-making process and cause fleck-patterned pinholes in the paper.

The fine-grained powder may be either inorganic or organic, but in the case of using organic powder, the powder should have a sufficiently high melting point so that they would not melt at the hot-pressing. The amount of the coverage is properly selected provided that they cause no inconvenience in the later step of resin impregnation.

As described above, a fleck-patterned paper or a matrix paper is obtained by an internal adding process, which comprises preparing a water dispersion of components, making a paper therefrom by a known wet-paper making process or a method in accordance therewith, and drying the paper.

The paper having granitic flecks as prepared above is then impregnated with a thermosetting resin and dried to reduce the impregnated amount of the resin to from 25 to 60% by weight. A plurality of the resulting paper sheet is then laminated and hot-pressed to give the solid material according to the present invention.

Any type of thermosetting resin may be used in the present invention, such as a water-soluble type, a water-dispersive type, and a solution of an organic solvent. It is preferred that the thermosetting resin be impregnated in the paper at an amount of from 25 to 60% by weigh, provided that the resin content is expressed by:

{(Weight after impregnation)−(Weight before impregnation)}/Weight after impregnation ×100 (% by weight).

If the resin content is less than 25% by weight, the resin flow becomes insufficient and causes thin spots, whereas a resin content of over 60% by weight makes the resin excessively flowable.

As the preferred thermosetting resin for use in the present invention, mentioned are phenolic resin, melamine resin, urea resin, unsaturated polyester, epoxy resin, diallyl phthalate resin, alkyd resin, polyimide, polyamide, imide resin, and furan resin, but it is not restricted thereto, and those which can yield a solid material upon hot pressing are also applicable.

The sheets obtained drying the resin-impregnated papers are then laminated and hot-pressed to obtain the final solid product. The conditions under which the hot-pressing is performed, i.e., temperature, pressure, and duration, are properly selected in accordance with the resin used. The paper laminate may comprise as many layers as desired.

EXAMPLES

Now the invention is described in further detail referring to examples, but it should be understood that the present invention is not limited thereto. In the examples below, the properties were evaluated according to the tests as follows:

(1) Texture

Visually inspected to see whether it has an inorganic, granitic-stone like appearance as a whole.

A: excellent; B: good; C: fair; D, poor.

(2) Impact resistance

A steel ball 500 grams in weight was dropped from a 30-cm height, and the surface of the test sample was observed.

A: free from cracks; B: cracks were observable; C: a considerable amount of cracks was observed; D: broke into pieces.

(3) Abrasion resistance

Taber abrasion index was measured; i.e., the test sample was subjected to 1000-turn abrasion using a Taber machine under a load of 1 kg, and the weighs loss was given in percentage.

A: 10% or less; B: from 10 to 30%; C: from 30 to 50%; D: 50% or more.

(4) Heat resistance

The surface of the sample was observed after mounting thereto an oil bath at 200° C. for 10 minutes.

A: no change observed; B: slight change in color; C: considerable change in color; D: greatly changed in color.

(5) Dimensional stability

Change in dimension was measured after immersing the sample into water for 24 hours.

A: no change; B: 0.5% or less; C: from 0.5 to 1.0%; D: 1.0% or more.

(6) Secondary machinability

Totally evaluated from the cuttability, bending, applicability to drilling, and adhesibility.

A: excellent; B: fair; C: not good; D: poor.

(7) Minimum thickness required

The minimum thickness required for use as a building material of 30 cm square plate was examined.

EXAMPLE 1

A water dispersion was prepared by adding to water, 40 parts by weight of cotton linter pulp as the cellulose pulp, 20 parts by weight of chopped strands of long glass fiber (6 μm in average fiber diameter and 6 μm in average fiber length) as the artificial fiber, 25 parts by weight of an aluminum hydroxide (Higilite H-32, consisting of grains 3.2 μm in average diameter, manufactured by Showa Danko K. K.) and 2 parts by weight of titanium oxide (Tipaque R-820, consisting of grains 0.3 μm in average diameter, manufactured by Ishihara Sangyo Kaisha, Ltd.) as the inorganic fillers, and 8 parts by weight of artificial graphite powder (50 μm in average diameter, with a size distribution of from 20 to 200 μm) as the fine-grained powder additive, to which was further added 1.5 parts by weight of a melamine resin type paper additive. To this water dispersion were added aluminum sulfate and sodium aluminate to control the pH to 5.5, and a paper sheet 120 g/m² in density was obtained in a TAPPI standard sheet machine from the resulting water dispersion.

The resulting paper sheet was then impregnated with a solution containing a water-soluble melamine resin (Nikaresin, manufactured by Nippon Carbide Industry Co., Ltd.) at a concentration of 50% by weight, to give a paper impregnated with 52% resin (weight after impregnation being 250 g/m²), dried, and 16 sheets thereof were layered and subjected to hot-pressing at 130° C. for 30 minutes under a pressure of 80 kg/cm², to give a plate 3 mm in thickness.

EXAMPLE 2

A water dispersion was prepared by adding to water, 40 parts by weight of bleached sulfite pulp (NBSP) as the cellulose pulp, 20 parts by weight of chopped strands of long glass fiber (6 μm in average fiber diameter and 6 μm in average fiber length) and 10 parts by weight of cut rayon (2 Denier ×5 mm long) as the artificial fibers, 50 parts by weight of an aluminum hydroxide (Higilite H-32, consisting of grain 3.2 μm in average diameter, manufactured by Showa Denko K. K.), 10 parts by weight of silica powder (3 μm in average diameter) and 5 parts by weight of titanium oxide (Tipaque R-820, consisting of grain 0.3 μm in average diameter, manufactured by Ishihara Sangyo Kaisha, Ltd.) as the inorganic fillers, and a trace amount of condensed-type azo pigment. From this water dispersion was obtained a pale ivory-colored matrix paper 130 g/m² in weight by a wet process, using a Fourdrinier paper machine. Onto the surface of the resulting paper was sprayed a commercially available Chinese ink (comprising grains 1 μm in average diameter) to obtain a paper having flecks from 50 to 500 μm in diameter, 400 μm in average. In this case, each diameter of the fleck was measured for 20 flecks taken from the largest ones on a 20-times magnified micrograph for a sample area of 1.5 mm × 1.5 mm square, and the average of the diameters thus measured was given as the average diameter.

The fleck-patterned paper prepared above was impregnated with a melamine resin and dried as in Example 1 to obtain an impregnated paper 250 g/cm² in weight, and eight sheets of the impregnated paper were layered to obtain a solid material by hot pressing in the same manner as Example 1. The resulting plate had a thickness of 1.5 mm, an appearance well comparable to that of a naturally occurring granitic stone, and good physical properties capable to of undergoing a bending process.

Properties of the molded plates obtained in Examples 1 and 2 were evaluated and compared with those of a commercially available artificial granite-type extrusion-molded artificial granitic stone-like solid material (Granitic stone-like Korean, manufactured by Dupont Co,, Ltd. ) thinned to a thickness of 3 mm. The results are given in Table 1.

TABLE 1

|  | Example 1 | Example 2 | Comp. Ex. 1 |
|---|---|---|---|
| Texture | A | B | A |
| Impact resistance | A | A | D |
| Abrasion resistance | A | A | D |
| Heat resistance | B | B | C |
| Dimensional stability | B | B | B |
| Secondary machinability | B | A | C* |
| Minimum thickness | 1.2 mm | 1.2 mm | 6.0 mm |

*Not resistant to bending process.

As is clearly read from Table 1, the solid material of Examples 1 and 2 according to the present invention was superior in all of the properties.

EXAMPLE 3

A water dispersion was prepared by adding to water, 85 parts by weight of bleached sulfide pulp (NBSP) as the cellulose pulp, 15 parts by weight of chopped strands of long glass fiber (6 μm in average fiber diameter and 6 μm in average fiber length), 30 parts by weight of an aluminum hydroxide (consisting of grains 0.2 μm in average diameter), 10 parts by weight of silica powder (3 μm in average diameter) and 3 parts by weight of titanium oxide (Tipaque R-820, consisting of grains 0.3 μm in average diameter, manufactured by Ishihara Sangyo Kaisha, Ltd. ) as the inorganic fillers. To this water dispersion was added, with respect to the total of solids, 3% by weight of a black-colored thermosetting-type epoxy resin powder (Aron powder E-100, consisting of grains 60 μm in average diameter, manufactured by Toagosei Chemical Industries Co., Ltd.), and a sheet 120 g/m² in weight was obtained therefrom in the same manner as in Example 1.

Then, in the same manner as in Example 1, the sheet was impregnated with the water-soluble melamine resin and dried to obtain a resin-impregnated sheet containing 40% by weight of the resin. Thirty two resin-impregnated sheets were superposed and hot-pressed at 130° C. for 30 minutes under a pressure of 80 kg/cm², to give a molded plate 6 mm in thickness.

EXAMPLE 4 and 5, and COMPARATIVE EXAMPLES 2 and 3

The same process as in Example 3 was repeated to obtain molded plates 6 mm thick, except for changing the amount of the black colored fine-grained additive (Aron powder E-100, 60 μm in average grain size, manufactured by Toagosei Chemical industries Co., Ltd.) to 10 and 25% by weigh, for Examples 4 and 5, respectively, and to 0.5 and 35 for Comparative Examples 2 and 3, respectively. The texture for each of the molded plates was evaluated, and the results are given in Table 2.

TABLE 2

|  | Resin powder (wt. %) | Texture |
|---|---|---|
| Example 3 | 3 | B |
| Example 4 | 10 | A |
| Example 5 | 25 | A |
| Comp. Example 2 | 0.5 | C |
| Comp. Example 3 | 35 | C |

From Table 2 it can be read that too small an amount (0.5% by weight) of the black-colored epoxy resin powder results in a molded plate having sparsely distributed flecks (Comparative Example 2) or an excessive amount (35% by weight) of the powder results in a molded plate having too dense flecks (Comparative Example 3), both lacking a granitic stone-like appearance and therefore not favorable. Accordingly, the black-colored thermosetting epoxy resin powder should be incorporated in the molded plate for an amount of from 1 to 30% by weight to give a favorable granitic stone-like appearance.

It can be seen from above that the present invention provides a novel-type building material for use in both interiors and exteriors, i.e., an artificial granite solid material well-comparable to that of a conventional artificial solid material which has a granite (the so-called Mikage-ishi)-like appearance in the field of artificial granites. The artificial granite solid material according to the present invention has an inorganic material-like texture as well as a granitic stone-like texture expressing by itself heaviness, hardness, and thickness, yet has an excellent secondary machinability as well as physical properties(strength), and is suitable for use in furniture, kitchen systems, interiors, exteriors, and widely in various other fields.

What is claimed is:

1. An artificial granite produced by impregnating a paper sheet having a granitic fleck pattern with a thermosetting resin to give a paper containing from 25 to 60% by weight of the resin on a dry basis, said paper comprising:

(A) form 20 to 80% by weight of cellulose pulp, (B) from 2 to 40% by weight of an artificial fiber,
(C) from 10 to 70% by weight of an inorganic filler less than 10 μm in average diameter, and
(D) from 1 to 30% by weight of a fine-grained additive consisting of grains from 10 to 500 μm in average diameter, and having a color hue different from that of the inorganic filler (C), and drying the resin-impregnated paper sheet and forming and hot-pressing a laminate comprising a plurality of the dried sheets.

2. An artificial granite produced by:

providing a fleck-patterned layer comprising flecks from 10 to 500 μm in average diameter on one or both sides of a matrix paper sheet, said paper comprising (A) from 20 to 80% by weight of cellulose pulp, (B) from 2 to 40% by weight of an artificial fiber, and (C) from 10 to 70% by weight of an inorganic filler less than 10 μm in average diameter, and said fleck patterned layer comprising fine-grained additive consisting of grains from 500 μm or less in average diameter, having a color hue different from that of the inorganic filler (C);

impregnating the paper sheet with a thermosetting resin to give a paper containing from 25 to 60% by weight of the resin at the dry basis;

drying the resin-impregnated paper sheet; and hot-pressing a laminate comprising a plurality of the dried sheets.

* * * * *